May 17, 1966 J. A. MARTIN 3,252,107

VARIABLE DISPLACEMENT POLYPHASE INVERTERS

Filed March 28, 1962 2 Sheets-Sheet 1

INVENTOR.
JOSEPH A. MARTIN

BY

[signature]

ATTORNEY

May 17, 1966 J. A. MARTIN 3,252,107

VARIABLE DISPLACEMENT POLYPHASE INVERTERS

Filed March 28, 1962 2 Sheets-Sheet 2

INVENTOR
JOSEPH A. MARTIN

BY [signature]

ATTORNEY 3,252,107

VARIABLE DISPLACEMENT POLYPHASE INVERTERS

Joseph A. Martin, Dayton, Ohio, assignor to American Machine & Foundry Company, a corporation of New Jersey Filed Mar. 28, 1962, Ser. No. 183,200
6 Claims. (Cl. 331—45)

Figures 2A, 2B, 2C, 2D, 2E, 2F:
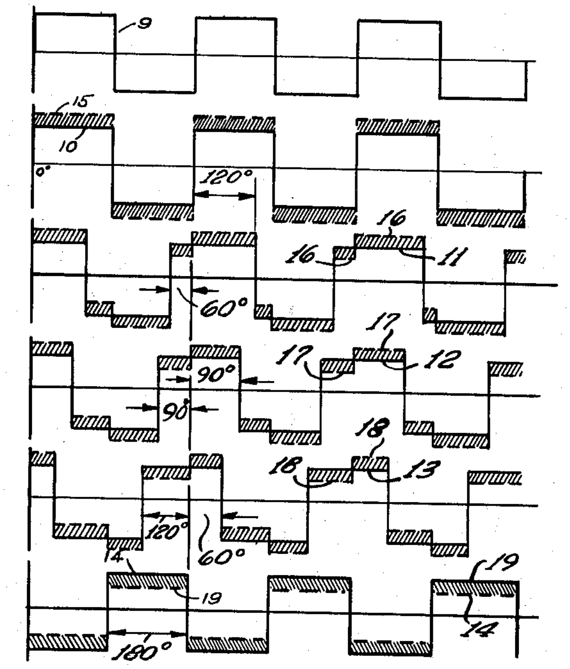

This invention relates to polyphase inverters, and more particularly to such inverters in which several oscillators are interconnected in master-slave relationship.

Light weight inverters utilizing solid state elements perform the very useful function of converting direct current power into alternating current power, replacing heavier, less efficient rotary equipment. Single phase inverters of this type find extensive use, while polyphase inverters, on the other hand, are relatively unknown because of the difficulty experienced in interconnecting several single phase inverters to provide the proper phase displaced outputs.

In the article "Transistor-Oscillator Induction-Motor Drive," W. H. Card, A.I.E.E. Transactions—Pt. 1 (Communications and Electronics), vol. 77, 1958, pp. 531–535, a two-phase inverter is described including two saturable reactor oscillators interconnected in master-slave relationship. The two oscillators are identical except that the main winding on the saturable reactor core of the slave oscillator is separated into two separate sections. These sections are connected to taps on the main winding of the master oscillator to obtain phase locking at 90°.

In a subsequent article, "Self-Locking Polyphase Transistor-Magnetic Inverters" by C. H. R. Campling and J. A. Bennett, 1960 Proceedings of Special Technical Conference on Non-Linear Magnetics and Magnetic Amplifiers, A.I.E.E. Publication T–121, pp. 333–348, the earlier concept developed by Card is expanded to provide phase locking at other than 90°.

Apparently, by changing the number of turns in the slave oscillator main winding so that the slave oscillator is no longer identical to the master oscillator, phase locking at other than 90° results. Thus, the phase displacement was found to depend upon the ratio between the turns on the slave oscillator main winding and the turns on the master oscillator main winding. Unfortunately, a turns ratio is not readily adjustable and generally cannot be adjusted by automatic circuits such as, for example, are often required to compensate for changes in phase displacement caused by load and temperature changes.

An object of this invention is therefore to provide a polyphase inverter in which the phase displacement between the outputs can easily be varied by an impedance adjustment.

Another object is to provide a polyphase oscillator in which the phase displacement between outputs is continuously variable and can be controlled by an external regulating circuit.

Still another object is to provide a polyphase inverter including oscillators interconnected as master and slave, in servo fashion, to maintain a variable selected phase relationship between the oscillator output signals by momentarily varying the apparent free running frequency of the slave oscillator.

The foregoing objects of the invention are realized by utilizing a fixed frequency master oscillator and a variable frequency slave oscillator. The slave oscillator is of a type which produces an output signal varying in frequency in accordance with the volt-time integral of an applied timing signal. A feedback signal from the output of the slave oscillator is combined in a summation circuit with a control signal from the output of the master oscillator to obtain a timing signal in which the volt-time integral varies inversely with respect to the phase relationship between the oscillator outputs. With this arrangement, the slave oscillator will lock-in at a certain phase displacement between 0° and 180° and produce an output signal having the same frequency as the master oscillator. As the phase relationship tends to change, the volt-time integral of the timing signal changes, causing the slave oscillator to correct to this change by momentarily increasing or decreasing its apparent operating frequency. The phase relationship thus established can be varied by changing the magnitude of either the control signal, the feedback signal, or the timing signal by means of a suitable impedance varying device or the like.

Figure 1:
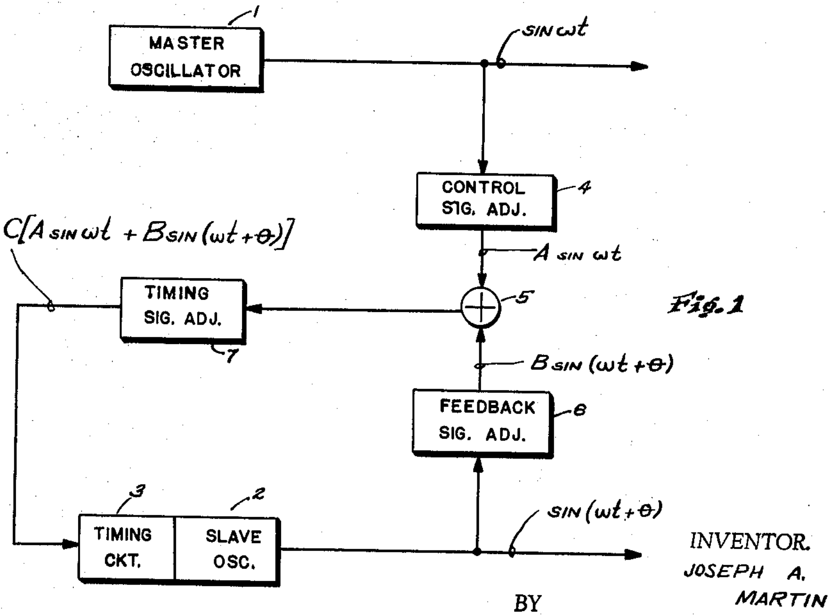
Figure 3:
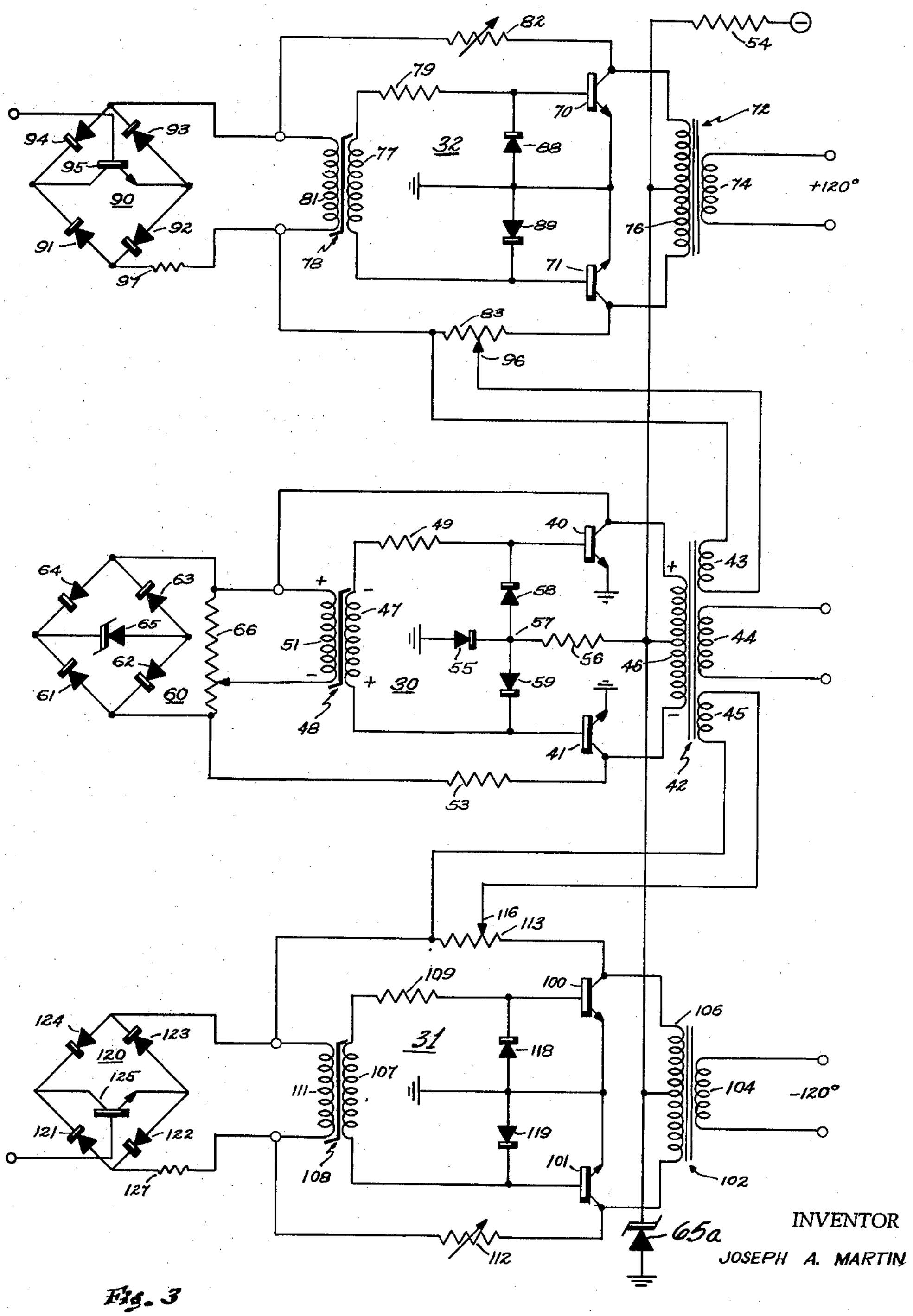

In order that the manner in which these and other objects are attained in accordance with the invention can be understood in detail, reference is had to the accompanying drawings, which form a part of this specification, and wherein:

FIG. 1 is a block diagram illustrating the interconnections between a master and slave oscillator in accordance with the invention;

FIG. 2*a* is a waveform illustrating the output signal from a master oscillator;

FIGS. 2*b*–2*f* are waveforms illustrating the timing signals for various phase displacements between the master and slave oscillator output signals; and FIG. 3 is a schematic diagram of a three-phase inverter circuit in accordance with the invention.

The interconnection between a master oscillator and a slave oscillator, in accordance with this invention, is illustrated in the block diagram of FIG. 1. Master oscillator 1 can be of virtually any known type and advantageously includes a frequency regulating circuit for maintaining the output signal at a constant frequency. Slave oscillator 2 can be any oscillator including a timing-circuit portion 3 which is responsive to the volt-time integral of an applied timing signal. Such timing circuits can include, for example, a saturable reactor which may be a saturable core transformer or a capacitor which have the characteristic of reaching saturation or a designated output level, respectively, in a time interval dependent upon the volt-time integral of an applied timing signal. This time interval governs the oscillating frequency of the slave oscillator.

Portions of the output signals from the master and slave oscillators, designated as the control and feedback signals, respectively, are utilized in obtaining a timing signal for the slave oscillator. The control signal is supplied to a summation circuit 5 via a control signal adjustment circuit 4 which adjusts the magnitude of the signal. Similarly, the feedback signal is supplied to summation circuit 5 via feedback signal adjusting circuit 6 which controls the magnitude of the feedback signal. Summation circuit 5 algebraically sums the control signal and the feedback signal and derives a timing signal which is applied to the timing circuit 3 via timing signal adjustment circuit 7, the adjustment circuit controlling the magnitude of the timing signal.

For purposes of illustration, it is assumed that the output signal from both master oscillator 1 and slave oscillator 2 is a sine wave and that the phase displacement between these signals is a phase angle $\theta$ and therefore the oscillator outputs are designated as $\sin \omega t$ and $\sin (\omega t+\theta)$, respectively. The output from control signal adjustment circuit 4 may be designated as $A \sin \omega t$, and the output from feedback signal adjustment circuit 6 may be designated as $B \sin (\omega t+\theta)$, the values of A and B being determined by the corresponding adjustment circuit. The timing signal is appropriately designated $$C\,[A \sin \omega t + B \sin (\omega t + \theta)]$$

the variable C being controlled by timing signal adjustment circuit 7.

It should be noted that the timing signal applied to timing circuit 3 is an algebraic summation of the control signal and the feedback signal, and therefore has a maximum value when $\theta$ is zero, and a minimum value when $\theta$ is equal to 180°. In other words, if $\theta$ is equal to zero, the signals are in phase and fully additive at all times, producing a maximum timing signal. If $\theta$ has any value other than zero, the signals are at least in partial opposition, the opposition between the signals increasing as the phase displacement increases, thus reducing the timing signal accordingly. The minimum timing signal occurs when $\theta$ becomes 180°, at which time the signals are in complete opposition. The volt-time integral of the resulting timing signal, i.e., the area beneath the voltage versus time curve taken over a half-cycle, therefore has a maximum value when $\theta$ is zero, gradually decreasing to a minimum value as $\theta$ approaches 180°.

The timing signal is employed to control the apparent frequency of slave oscillator 2 via timing circuit 3 to in turn control the phase displacement between the master and slave oscillator output signals in servo fashion. If the phase angle $\theta$ tends to increase, the volt-time integral of the timing signal decreases, causing a slight decrease in apparent oscillating frequency in turn, bringing about a decrease in the phase angle. Similarly, if the phase angle tends to decrease, the volt-time integral of the timing signal increases, bringing about a compensating decrease in the slave oscillator apparent frequency.

In this manner, a desired phase displacement is maintained.

Several observations should be made with regard to the operation of the master-slave inverter circuit illustrated in FIG. 1.

(1) The master and slave oscillators will operate at essentially the same frequency since a tendency for the slave oscillator to operate at a higher frequency results in an increase in $\theta$, causing a decrease in the operating frequency through the servo loop, and vice versa.

(2) If the feedback signal adjustment circuit 6 and the timing signal adjustment circuit 7 are so adjusted that the apparent frequency (the operating frequency of the slave oscillator when there is no control signal) is the same as the operating frequency of the master oscillator, then the output signals from the oscillators are maintained in a quadrature relationship regardless of the magnitude of the control signal. With a quadrature relationship, the control signal opposes the feedback signal for exactly half of each half-cycle, and aids for the remaining half of each half-cycle. Under these circumstances, the control signal cannot vary the volt-time integral of the timing signal, and therefore the oscillators operate in a quadrature relationship regardless of the control signal magnitude.

(3) To obtain a phase displacement greater than 90°, adjustment circuits 6 and 7 are so adjusted that the apparent frequency of the slave oscillator exceeds the operating frequency of the master oscillator. Under these circumstances, the slave oscillator tends to run ahead of the master oscillator, continually increasing the phase angle $\theta$. However, as $\theta$ increases, the volt-time interval of the timing signal decreases, effectively decreasing the operating frequency of the slave oscillator. Eventually, an equilibrium point is reached where the slave oscillator operates at the same frequency as the master oscillator with a certain phase displacement. This phase displacement can be adjusted by varying the magnitude of either the control signal, the feedback signal or the timing signal by means of their respective adjustment circuits 4, 6 and 7.

(4) To obtain a phase displacement between zero and

90°, the apparent frequency of the slave oscillator is adjusted to be less than the operating frequency of the master oscillator. When the control signal is subsequently added to the feedback signal, the volt-time integral of the timing signal is increased and an equilibrium is obtained at a phase displacement between zero and 90°. This phase displacement can be varied by adjusting the magnitude of either the control signal, the feedback signal or the timing signal by means of their respective adjustment circuits 4, 6 and 7.

(5) The master and slave oscillators can be made to lock-in at any leading phase displacement between zero and 180°, but cannot lock-in at any lagging phase displacement between zero and 180°. The volt-time integral of the timing signal decreases in accordance with increases of the lagging phase angle. Accordingly, if a slave oscillator providing a lagging phase displacement tends to run behind, the lagging phase angle increases, in turn decreasing the volt-time integral of the timing signal. The decreased volt-time integral causes the slave oscillator to run even further behind, indicating that the servo control is unstable at lagging phase displacements. The fact that the oscillators will not lock-in at lagging phase displacements is no serious problem, however, since any lagging phase displacement can be obtained by merely inverting the output signal from the slave oscillator, i.e., in effect shifting the output 180°.

In inverter circuits, it is often desirable to employ oscillators providing a square wave output instead of a sine wave output. Square wave oscillators can be phase locked in master slave oscillator relationship in the same way as the sine wave oscillators. Assuming that output signal from the master oscillator is a square wave, then the corresponding control signal from the master oscillator is also a square wave, as represented by curve 9 in FIG. 2*a*. The feedback signal from the slave oscillator is represented by the square wave curves 10–14 in FIGS. 2*b*–2*f*, representing respectively leading phase displacements of 0°, 60°, 90°, 120°, and 180°.

If the output signals from the oscillators are in phase, the control signal 9 is in phase with feedback signal 10 and the signals are always additive, resulting in a timing signal represented by dotted line waveform 15. The timing signal 15 has a volt-time integral over a half-cycle which is much increased as compared to that of feedback signal 10.

If the feedback signal leads the control signal by 60°, a condition represented in FIG. 2*c*, the signals are additive for 120° and in opposition for 60°, resulting in a timing signal having a waveform as represented by dotted line curve 16. Since the signals aid one another more than the oppose one another, the volt-time integral of timing signal 16 is greater than the corresponding volt-time integral of feedback signal 11. However, the volt-time integral of timing signal 16 is less than that of phase timing signal 15 in FIG. 2*b*.

If the feedback signal leads the control signal by 90°, a condition represented in FIG. 2*d*, the signals are additive for 90° and in opposition for 90°, resulting in a timing signal 17 shown in dotted lines. Since the additive portion is exactly equal to the opposition portion, the volt-time integral of timing signal 17 is the same as the volt-time integral of feedback signal 12. As represented in FIG. 2*e*, if the feedback signal leads the control signal by 120°, the signals are additive for 60° and in opposition for 120°, resulting in a timing signal represented by the dotted line curve 18. Since the signals are in opposition more than they are additive, the volt-time integral of timing signal 18 is less than the volt-time integral of feedback signal 13. In FIG. 2*f*, the condition is represented where the feedback signal is 180° out of phase with the control signal and therefore the signals are always in complete opposition, resulting in a timing signal 19, shown in dotted lines, having a volt-time integral much less than that of feedback signal 14.

It is significant to note that the volt-time integral of the timing signal varies inversely with respect to the leading phase angle between the control signal and the feedback signal between zero and 180°. In other words, the volt-time integral of the timing signal is maximum if the control signal and feedback signal are in phase, decreasing to a minimum volt-time integral as the signals approach 180° phase displacement. Accordingly, this resulting timing signal has the necessary requirements for controlling the frequency of the slave oscillator in servo fashion, as previously described in connection with FIG. 1.

For the purposes of illustration, a three-phase inverter constructed in accordance with the principles set forth is shown schematically in FIG. 3, including a master oscillator 30 and two slave oscillators 31 and 32. Slave oscillator 32 is adjusted to provide a leading phase displacement of 120°, and slave oscillator 31 is adjusted to provide a leading phase displacement of 60° so that the output can be inverted to provide a lagging 120° phase displacement.

Master oscillator 30 includes two NPN type transistors 40 and 41. An output transformer 42 includes secondary windings 43, 44 and 45 and has a center tapped primary winding 46 connected between the collectors of transistors 40 and 41. Emitters of transistors 40 and 41 are each connected to ground. The bases thereof are connected to opposite ends of output winding 47 of a saturable reactor timing element 48 via resistor 49. One end of input winding 51 of saturable reactor 48 is connected to the collector of transistor 40, the other end of the input winding being connected to the collector of transistor 41 through resistor 53.

A Zener diode *65a* is connected in series with a resistor 54 between a source of positive potential and ground to obtain a fixed positive potential at the center tap of primary winding 46 which is connected to the junction between the Zener diode and the resistor. A diode 55 is connected in series with a resistor 56 to form a voltage divider connected between ground and the fixed positive potential provided at the cathode of Zener diode *65a*, thereby providing a slightly positive potential at junction 57 between the diode and the resistor. The base of transistor 40 is connected to junction 57 via diode 58, and the base of transistor 41 is connected to junction 57 through diode 59. Diode 55 is poled in a direction to permit current flow from ground to the positive source of potential. Diodes 58 and 59 are poled in a direction permitting current flow from junction 57 to the base of their respective transistors when the junction is positive with respect to the base.

Master oscillator 30 provides a square wave output signal on secondary windings 43–45 when in operation. Initially, the slightly positive potential at junction 57 renders both transistors 40 and 41 slightly conductive, but due to the slight difference in characteristics between the transistors, one transistor will be slightly more conductive than the other. Assuming that transistor 41 is the more dominant conductive transistor, the conduction thereof permits curent flow from the positive source of potential through a portion of primary winding 46, and through the collector-emitter circuit of transistor 41 to ground. This current flow through primary winding 46 causes one end of the primary winding to become negative, as indicated in the figure, whereas the other end of the primary winding, because of autotransformer action, becomes quite positive. Accordingly, current flows through input winding 51 from primary winding 46 through resistor 53, developing a potential across the input winding having a polarity as shown in the figure. The potential on input winding 51 causes saturable reactor 48 to go toward saturation and produces a potential at output winding 47 having the polarity as indicated in the figure. The potential at output winding 47 renders transistor 41 more conductive, and transistor 40 less conductive. The increased conduction of transistor 41 causes increased current flow through primary winding 46, in turn making the base of transistor 41 more positive and the transistor more conductive. This regenerative action through the saturable reactor very rapidly causes transistor 41 to become fully conductive, producing a maximum output potential of one polarity on second windings 43–45.

The oscillator circuit continues to operate in this manner until saturable reactor 48 becomes saturated, causing the potential appearing on output winding 47 to cease abruptly, in turn rendering transistor 41 nonconductive. Because of the inductance of the output winding 47, this abrupt change in potential produces an inductive kick, rendering the base of transistor 40 somewhat positive and the transistor somewhat conductive. By similar regenerative action through saturable reactor 48, transistor 40 is soon rendered fully conductive, providing an output potential on windings 43–45 of the opposite polarity. As soon as saturable reactor 48 again becomes saturated, transistor 40 is rendered nonconductive and transistor 41 again begins to conduct. In this manner, the transistors 40 and 41 are alternately rendered conductive, producing a square wave output potential at windings 43–45.

The operating frequency of the master oscillator is determined in accordance with the time required for saturable reactor 48 to reach saturation. The saturating time interval can be varied either by changing the construction of the saturable reactor, or by changing the volt-time integral of the signal applied to input winding 51. The maximum potential of the pulses applied to input winding 51, and hence the volt-time integral of these pulses, can be precisely controlled by connecting a full-wave Zener diode circuit across the input winding. Diodes 61–64 form a full-wave bridge circuit having a Zener diode 65 connected across one bridge diagonal and a variable resistor 66 and the adjustable tap thereof across the primary winding 51 of the saturable reactor 48.

Provided there is sufficient potential applied, Zener diode 65 maintains a constant potential in the inverse direction and in effect operates in the manner of a voltage regulator. Accordingly, the potential across variable resistor 66 cannot exceed the Zener breakdown potential, and therefore the potential across input winding 51 cannot exceed a certain predetermined potential, depending upon the adjustment of the tap on variable resistor 66. By adjusting the tap on resistor 66, the volt-time integral and hence the frequency of the master oscillator, is precisely controlled and maintained relatively constant.

Slave oscillator 32 is very similar in construction and operation to master oscillator 30. This oscillator includes two NPN type transistors 70 and 71. Output transformer 72 has a secondary winding 74 and a center-tapped primary winding 76, the ends of which are connected to the collectors of transistors 70 and 71, respectively. The bases of the transistors are connected to opposite ends of output winding 77 of the saturable reactor timing element 78 via resistor 79. One end of input winding 81 of saturable reactor 78 is connected to the collector of transistor 70 via variable resistor 82, the other end being connected to the collector of transistor 71 via resistor 83. The anodes of diodes 88 and 89 are connected to ground, while the cathodes thereof are connected to the bases of transistors 70 and 71, respectively. The center-tap of primary winding 76 is connected to the junction between resistor 54 and Zener diode 66.

The operation of slave oscillator circuit 32 is essentially the same as that previously described for master oscillator 30. Because of the regenerative action via the timing element saturable reactor 78, transistors 70 and 71 are alternately rendered fully conductive, thus providing a square wave output signal at secondary winding 74.

A fullwave transistor control circuit 90 is connected across input winding 81 to provide a variable impedance shunt across the input winding. This impedance circuit includes diodes 91–94 connected to form a fullwave bridge circuit. The collector-emitter circuit of an NPN type transistor 95 is connected across the output of the bridge circuit and therefore a variable impedance responsive to signals of either polarity is seen from the input to the bridge circuit, the value of the impedance varying in accordance to the potential applied to the base of transistor 95. If slave oscillator 32 is not connected to the master oscillator 30, it is apparent that the slave oscillator would have an independent operating frequency, for convenience referred to as the apparent frequency of the slave oscillator. The apparent frequency can be varied by adjusting impedance 82 to vary the volt-time integral of the feedback signal supplied to input winding 81. Also, the apparent frequency is variable in accordance with the value of a shunt impedance provided by impedance circuit 90.

Secondary winding 43 of the master oscillator is connected between an adjustable tap 96 and one end of resistor 83. A portion of the output signal developed by master oscillator, i.e., the control signal, is provided across the portion of resistor 83 which is connected across secondary winding 43, causing current flow proportional to this signal to flow through the input winding 81 by means of the circuit completed through resistor 82 and primary winding 76. Accordingly, the feedback signal from slave oscillator 32, as developed by transistors 70 and 71, is mixed with a control signal developed across resistor 83 to derive a timing signal which is applied to the timing element saturable reactor 78. The magnitude of the control signal can be varied by adjusting tap 96. With this circuit arrangement, control over the feedback signal and control signal magnitudes is not entirely independent as was the case in the preivously described block diagram of FIG. 1. However, it is significant that the ratio and magnitudes can be adjusted to any desirable value, and the magnitude of the resulting timing signal can also be adjusted through any desirable value. Therefore, by proper manipulation of the three adjustments, namely, resistor 82, the adjustable tap on resistor 83, and the impedance value transistor 95, any desirable mixture of the feedback and control signal can be obtained across input winding 81.

Since slave oscillator 32 is to provide an output signal leading the output signal from the master oscillator by 120°, the impedance value of transistor control means 90, and the resistance value of resistor 82 is so adjusted that the apparent frequency of slave oscillator 32 slightly exceeds the operating frequency of the master oscillator. Thereafter, the three impedance values are further adjusted to obtain the 120° phase displacement. It is pointed out that resistors 82 and 83 are shown as manually adjustable resistors, but can easily be replaced by other variable impedance circuits, thus eliminating the need for manual adjustments.

Slave oscillator 31 is the same as slave oscillator 32 and includes two NPN type transistors 100 and 101. An output transformeer 102 has a secondary winding 104, and a center-tapped primary winding 106, the ends of which are connected respectively to the collectors of transistors 100 and 101. The output winding 107 of a saturable reactor timing element 108 has one end thereof connected to the base of transistor 100 via resistor 109, and the other end connected to the base of transistor 101. One end of input winding 111 of saturable reactor 108 is connected to the collector of transistor 100 through resistor 113, the other end being connected to the collector of transistor 101 through variable resistor 112. Diode 118 is connected between the base of transistor 100 and ground, and diode 119 is connected between the base of transistor 101 and ground.

A variable impedance circuit 120 is connected across input winding 111. The collector-emitter circuit of transistor 125 is connected across the output of a fullwave bridge circuit formed by diodes 121–124, the input of this circuit being connected across input winding 111. Secondary winding 45 of the master oscillator is connected between a variable tap 116 on resistor 113, and one end of the resistor.

The operation of slave oscillator 31 is essentially the same as slave oscillator 32. Accordingly, the apparent frequency of this slave oscillator is varied by adjusting the impedance value of transistor 125 and the impedance value of resistor 112, and the phase displacement between the master oscillator and the slave oscillator is varied by adjusting either the impedance value of transistor 125, the impedance value of resistor 112, or the position to tap 116.

In order to obtain three-phase operation, it is necessary that the output from slave oscillator 31 lag the output from the master oscillator by 120°. However, as has previously been explained, it is not possible to achieve phase locking relationship for lagging phase displacements. Slave oscillator 31 is therefore adjusted to operate at a leading phase displacement of 60°. Since secondary winding 104 is isolated from the remainder of the oscillator circuit by transformer 102, the connection of secondary winding 104 to an external circuit is reversed to achieve a 180° phase shift. The net result of the 180° phase shift and the 60° leading phase relationship is a lagging phase development of 120° as desired. To achieve a 60° leading phase displacement in slave oscillator 31, resistor 112 and transistor 125 are so adjusted that the apparent frequency of slave oscillator 31 is somewhat less than the operating frequency of master oscillator 30. Then, by appropriate adjustment of the three slave oscillator controls, a 60° phase displacement can be obtained.

It is obvious that numerous changes can be made in accordance with this invention without departing from the scope thereof. For example, the oscillators employed could produce virtually any type of an output signal and is not limited to oscillators providing either sine wave or square wave outputs. Furthermore, this invention is not limited to master and slave oscillators operating at any particular phase displacement, but is equally applicable to any desired phase displacement between the master and slave oscillators. Also, virtually any type of oscillator may be employed as a master oscillator, and any type of oscillator having a timing means responsive to the volt-time integral of an applied timing signal can be employed. Examples of other suitable slave oscillators include mutlivibrator oscillators of a saturating or nonsaturating RC type, unijunction transistor oscillators, and blocking oscillators. The scope of this invention is more specifically pointed out in the appended claims.

What is claimed is:

1. A polyphase inverter for providing two separate output signals with a controlled phase displacement between them; the combination of a fixed frequency master oscillator for providing a first one of said output signals; a slave oscillator operable at a variable frequency in accordance with a control signal, for providing a second one of said output signals; saturable reactor means in the input of said slave oscillator for controlling the frequency thereof in accordance with the volt-time integral of said control signal; circuit means connected from said master oscillator to said slave oscillator including separate means for algebraically adding said first output signal to said second output signal to derive therefrom said control signal and applying to said saturable reactor means said control signal so as to cause said slave oscillator to lock-in at a certain phase displacement between certain phase angles, and to produce an output for said slave oscillator having the same frequency as said master oscillator, said slave oscillator having an apparent oscillating frequency when said control signal is absent, and said circuit means includes a variable resistance means connected between the output of said slave oscillator and said saturable reactor means and an impedance adjusting means connected in shunt with said reactor means for varying said apparent frequency to control the phase displacement between said output signals.

2. A polyphase inverter in accordance with claim 1, in which said impedance adjusting means within said circuit means for adjusting the magnitude of said timing signal is a transistor control means.

3. In an oscillator system for providing two output potentials having a controlled phase displacement between them, the combination of a master oscillator for providing a first output signal of a controlled frequency, a slave oscillator for providing a second output signal and comprising saturable reactor timing means connected to control the oscillating frequency of said slave oscillator in accordance with the time required to go from one saturated state to the other, and adjustable resistance feedback means for feeding to said saturable reactor means a signal proportional to the voltage of said second output signal to establish an apparent oscillating frequency in said slave oscillator, circuit means connected to said master oscillator for feeding to said saturable reactor means a signal proportional to said first output signal and such as to lock-in the slave oscillator at a leading phase displacement for certain angles with respect to the master oscillator in order to establish an actual slave oscillating frequency the same as said controlled frequency, and a second adjustable resistance means in said circuit means for adjusting the magnitude of the signal supplied via said circuit means.

4. In a polyphase inverter for providing at least two output signals with a controlled phase displacement between them, the combination of a master oscillator of constant frequency and square-waveform, a slave oscillator including a saturable reactor timing means for controlling the frequency thereof in accordance with the volt-time integral of an applied timing signal, summation means for algebraically adding a portion of the output signal of the master oscillator and a feedback signal from the output of the slave oscillator, to be referred to as the control signal and the feedback signal, respectively, to obtain said applied timing signal in which the volt-time integral varies inversely with respect to the phase relationship between the oscillator outputs, adjustable resistor means for separately adjusting the magnitude of the control signal and the feedback signal and an impedance varying means connected to said timing means for providing any desired mixture for control and feedback signals to adjust the phase displacements between the output of the master and slave oscillators to any desired value.

5. The polyphase inverter of claim 4, in which the output of both the master oscillator and slave oscillator is of square-waveform, and the feedback signal from the slave oscillator has leading phase displacements with respect to the square wave of the master oscillator so as to aid in phase locking the two oscillators in master-slave phase relationship in servo fashion.

6. The polyphase inverter of claim 4, in which said timing means comprises a saturable core transformer having input and output windings, said slave oscillator comprises two transistors each having base, emitter and collector electrodes, the emitters of the transistors being connected together, the bases of said transistors being connected to opposite ends of the output winding of said timing means and the collectors of said transistors being respectively connected through a first one of said adjustable resistor means for adjusting the magnitude of the feedback signal to one end of the input winding of the timing means and through a second one of said adjustable resistor means connected from the output of said master oscillator to the other end of said input winding, and said impedance varying means includes a transistor control device the output of which is connected across said input winding.

References Cited by the Examiner

UNITED STATES PATENTS

| | | | |
|---|---|---|---|
| 2,774,872 | 12/1956 | Howson | 331—17 X |
| 3,026,484 | 3/1961 | Bennett et al. | 331—45 |
| 3,031,629 | 4/1962 | Kadri | 331—52 X |
| 3,060,363 | 10/1962 | Jensen | 331—45 X |
| 3,175,167 | 3/1965 | Lloyd | 331—45 X |

OTHER REFERENCES

"Controlling With Magnetic Cores," by Cooperman in Electronic Industries, February 1961, pages 116–120.

Lloyd: "Half-Bridge Inverter Provides Economical Three-Phase Power," Electronics, Sept. 15, 1961, pages 62–65.

"A More Stable 3-Phase Transistor-Core Power Inverter," by Jewett et al. in AIEE Transactions, PT–I (Communications and Electronics), vol. 78, November 1959, pages 686–691.

ROY LAKE, *Primary Examiner.*

JOHN KOMINSKI, *Examiner.*

J. B. MULLINS, *Assistant Examiner.*